United States Patent
Furushima et al.

(10) Patent No.: US 8,156,651 B2
(45) Date of Patent: Apr. 17, 2012

(54) CENTRIFUGALLY CAST EXTERNAL LAYER FOR ROLLING ROLL AND METHOD FOR MANUFACTURE THEREOF

(75) Inventors: Kiyoshi Furushima, Fukuoka-ken (JP);
Shunji Matsumoto, Fukuoka-ken (JP);
Ryota Honda, Fukuoka-ken (JP);
Kiyoshi Hayashi, Fukuoka-ken (JP);
Takashi Honda, Fukuoka-ken (JP);
Masatsugu Uchida, Fukuoka-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 1151 days.

(21) Appl. No.: 11/575,127

(22) PCT Filed: Sep. 13, 2005

(86) PCT No.: PCT/JP2005/016859
§ 371 (c)(1),
(2), (4) Date: Dec. 21, 2007

(87) PCT Pub. No.: WO2006/030795
PCT Pub. Date: Mar. 23, 2006

(65) Prior Publication Data
US 2008/0226936 A1    Sep. 18, 2008

(30) Foreign Application Priority Data

Sep. 13, 2004 (JP) .............................. 2004-265628
Apr. 14, 2005 (JP) .............................. 2005-117008

(51) Int. Cl.
*B21K 1/02* (2006.01)
*B22D 13/02* (2006.01)
*F16C 13/00* (2006.01)

(52) U.S. Cl. ................... 29/895.32; 29/895.3; 29/527.6; 492/3; 492/58; 492/54; 492/53; 492/48; 148/539; 148/543; 148/324

(58) Field of Classification Search ................. 29/895.3, 29/895.32, 527.6; 492/1, 3, 48, 54, 58, 53; 148/539, 324, 542, 543
See application file for complete search history.

(56) References Cited

U.S. PATENT DOCUMENTS 3,670,800 A * 6/1972 De Vos ............................ 164/95
4,538,668 A * 9/1985 Nishihara et al. ............. 164/448
(Continued)

FOREIGN PATENT DOCUMENTS

| EP | 0 665 068 A | 8/1995 |
| EP | 1832665 A1 * | 9/2007 |
| JP | 03-254304 | 11/1991 |
| JP | 04158910 A * | 6/1992 |
| JP | 07-268569 | 10/1995 |

(Continued)

*Primary Examiner* — Essama Omgba
(74) *Attorney, Agent, or Firm* — Sughrue Mion, PLLC

(57) ABSTRACT

A method for producing an outer layer for a roll having a structure having MC carbide dispersed at an area ratio of 20-60%, comprising the steps of (1) centrifugally casting a melt having a composition comprising, by mass, 2.2-6.0% of C, 0.1-3.5% of Si, 0.1-3.5% of Mn, and 8-22% of V, the balance being Fe and inevitable impurity elements, to produce a cylindrical body comprising an inner layer having concentration MC carbide, an MC-carbide-poor outer layer, and a concentration gradient layer between the inner layer and the outer layer, in which the area ratio of MC carbide changes, and (2) cutting the cylindrical body to a depth at which the area ratio of MC carbide is 20% or more.

7 Claims, 10 Drawing Sheets

U.S. PATENT DOCUMENTS

| | | | |
|---|---|---|---|
| 4,721,153 A * | 1/1988 | Sano et al. | 164/448 |
| 4,726,417 A * | 2/1988 | Sano | 492/3 |
| 4,958,422 A * | 9/1990 | Oshima et al. | 492/3 |
| 5,167,068 A * | 12/1992 | Leino et al. | 29/895.32 |
| 5,225,007 A * | 7/1993 | Hattori et al. | 148/541 |
| 5,305,522 A * | 4/1994 | Nawata et al. | 29/895.32 |
| 5,316,596 A * | 5/1994 | Kataoka | 148/321 |
| 5,419,973 A * | 5/1995 | Hashimoto et al. | 428/683 |
| 5,445,589 A * | 8/1995 | Shimizu | 492/58 |
| 5,458,372 A * | 10/1995 | Goode | 280/819 |
| 5,514,065 A | 5/1996 | Noda et al. | |
| 5,674,171 A * | 10/1997 | Ichino et al. | 492/3 |
| 5,839,495 A * | 11/1998 | Ichino et al. | 164/95 |
| 6,095,957 A * | 8/2000 | Ichino et al. | 492/54 |
| 6,206,814 B1 * | 3/2001 | Tanaka et al. | 492/58 |
| 6,805,757 B1 * | 10/2004 | Windhager et al. | 148/324 |
| 2009/0092852 A1 * | 4/2009 | Furushima et al. | 428/656 |

FOREIGN PATENT DOCUMENTS

| | | |
|---|---|---|
| JP | 08-060289 | 3/1996 |
| JP | 08-302444 | 11/1996 |
| JP | 09-256108 | 9/1997 |
| JP | 9-256108 A | 9/1997 |
| JP | 8302444 A | 11/1998 |
| JP | 2000-288708 | 10/2000 |
| JP | 2000-288708 A | 10/2000 |
| JP | 2000-303135 | 10/2000 |
| JP | 2002-129275 A | 5/2002 |
| JP | 2004-114048 A | 4/2004 |

* cited by examiner

Distribution of Elements in Example 6

Distribution of MC Carbide in Example 6

○ Portion Without Concentrated Carbide in Example 4
● Carbide-Concentrated Portion in Example 4
□ Portion Without Concentrated Carbide in Example 6
■ Carbide-Concentrated Portion in Example 6
△ Conventional Example 2

CENTRIFUGALLY CAST EXTERNAL LAYER FOR ROLLING ROLL AND METHOD FOR MANUFACTURE THEREOF

FIELD OF THE INVENTION

The present invention relates to a centrifugally cast outer layer for a roll having excellent wear resistance, surface roughening resistance, seizure resistance, etc., which is particularly suitable for a work roll at a finishing stage of a hot strip mill, and its production method.

BACKGROUND OF THE INVENTION

The wear resistance and surface roughening resistance of a roll are important properties determining the productivity of rolling. Poor wear resistance causes a roll surface to be prematurely worn, resulting in rolled products with deteriorated dimensional precision. Also, when a roll surface is non-uniformly worn and roughened by contact with a work, a back-up roll, etc., such surface roughness is transferred to a work surface, resulting in a work with deteriorated appearance. To prevent this, the roll should be exchanged frequently, resulting in frequent stop of a rolling operation and thus decrease in the productivity of rolling factory, cost increase by the cutting of a roll surface, and decrease in yield consumption by the increased cutting of a roll surface.

The seizure resistance of a roll is also important. Poor seizure resistance causes a work to be seized with the roll by heat generated in the roll bite, etc. during rolling, failing to conduct normal rolling. Particularly in a downstream stand at a finishing stage of a hot strip mill, overlapped end portions of two works are rolled for some reasons, causing an accident called "thickness reduction." In this case, if the roll has poor seizure resistance, the work may be seized with the roll and wound around the roll body, making rolling stop inevitable. If rolling continues with the work seized with the roll, a rolling load is concentrated in a seized portion, generating cracks, from which spalling, etc. occurs to cause fracture.

The harder the roll, the higher wear resistance it has. A high-speed steel roll material contains high-hardness carbides of alloying elements such as MC, $M_2C$, $M_6C$, $M_7C_3$, etc. Among the alloying elements, particularly V and Nb form extremely hard MC carbides having Vickers hardness Hv of about 2400-3200, remarkably contributing to improvement in wear resistance. However, when a melt containing large amounts of V and Nb is centrifugally cast, MC carbides are centrifugally segregated inward.

JP8-60289A discloses a centrifugally cast, solid or hollow, composite roll comprising an outer layer having a composition comprising, by mass, 1.0-3.0% of C, 0.1-3.0% of Si, 0.1-2.00% of Mn, 2.0-10.0% of Cr, 0.1-10.0% of Mo, 1.0-10.0% of V, 0.1-10.0% of W, Mo+W≦10.0%, and the balance being Fe and impurities, and an inner layer of cast iron or steel. This reference describes that when V exceeds 10.0% by mass, light carbides are segregated toward an inner surface by centrifugal casting, with small amounts of carbides remaining at an outer surface of an outer layer to be used for rolling. This phenomenon tends to occur when granular carbides are primarily crystallized from a melt. Because primarily crystallized granular carbides have specific gravities of about 6 g/cm$^3$, lighter than the melt having a specific gravity of about 7-8 g/cm$^3$, they move toward an inner surface by a centrifugal force.

To prevent segregation due to centrifugal separation by providing carbides with larger specific gravities, JP9-256108 A proposes a tool steel for hot-rolling, which comprises 3.5-5.5% of C, 0.1-1.5% of Si, 0.1-1.2% of Mn, 4.0-12.0% of Cr, 2.0-8.0% of Mo, and 12.0-18.0% of V the balance being Fe and inevitable impurities. VC having a small specific gravity is segregated by centrifugal casting, while Nb prevents the segregation of carbide by centrifugal separation because it forms composite carbide of (V; Nb)C having a large specific gravity with V.

JP3-254304A discloses a composite roll for hot-rolling, which has an outer layer having a structure containing 5-30% of granular carbide and 5% or less of non-granular carbide by area, its matrix having Vickers hardness Hv of 550 or more. The outer layer of this composite roll for hot-rolling has a basic composition comprising 1.0-3.5% of C, 3.0% or less of Si, 1.5% or less of Mn, 2-10% of Cr, 9% or less of Mo, 20% or less of W, and 2-15% of V by mass, the balance being Fe and impurities. However, this composite roll is produced by a so-called continuous casting method, by which an outer layer is continuously formed around a steel shaft using a high-frequency coil. The continuous casting method suffers from a higher production cost than the centrifugal casting method, and is little adapted for producing a large roll.

JP7-268569A discloses a wear-resistant sintered alloy comprising, by weight, 1.8-5% of C, 2% or less of Si, 2% or less of Mn, 4-6% of Cr, 2-8% of W, 2-10% of Mo, more than 11% and 17% or less of V, and 7-13% of Co, the balance being Fe and inevitable impurities, and containing MC carbide particles having an average diameter of 1-30 μm at an area ratio of 20-40%. However, because this alloy is produced by a HIP method, it suffers from a higher production cost than that produced by the centrifugal casting method, and is little adapted for producing a large roll.

JP2000-303135 A discloses a composite roll for hot-rolling, which comprises a centrifugally cast outer layer and an inner layer fused via an intermediate layer, the outer layer having a composition comprising, by weight, 1.5-2.6% of C, 0.1-2.0% of Si, 0.1-2.0% of Mn, 7-15% of Cr, 2.5-10% of Mo, 3-10% of V, and 0.5-5% of Nb, the balance being Fe and inevitable impurities, and the composite roll having an average thermal expansion coefficient of 11.5×10$^{-6}$/° C. or less in a range from room temperature to 300° C. In this composite roll, thermal expansion is suppressed by controlling the thermal expansion coefficient of the outer layer. However, because MC carbides such as VC, etc. are segregated inward in the centrifugally cast outer layer, the surface wear resistance is not necessarily fully improved.

OBJECTS OF THE INVENTION

Accordingly, an object of the present invention is to provide a centrifugally cast outer layer for a roll, which is free from the problem of the segregation of MC carbide, and has excellent wear resistance, surface roughening resistance and seizure resistance, and its production method.

DISCLOSURE OF THE INVENTION

As a result of intense research in view of the above objects, the following has been found to achieve the present invention.

(a) Positively utilizing a phenomenon that when a melt having a composition forming primarily crystallized MC carbide is centrifugally cast, MC carbide having a small specific gravity is concentrated on the inner surface side, cutting of a centrifugally cast item to leave a layer in which MC carbide is concentrated after centrifugal casting can surely form an outer layer for a roll containing a lot of MC carbide at a low cost, without necessity of remarkably increasing the concentration of V in the melt.

(b) For the reduction of a thermal expansion coefficient, effective for suppressing thermal crown, a large amount of MC carbide having a small thermal expansion coefficient should be uniformly precipitated in the outer layer structure.

(c) Because MC carbide has higher thermal conductivity than that of an Fe matrix (particularly the thermal conductivity of VC is about 4 W/m·K, much lower than about 30-50 W/m·K of the Fe matrix), it is effective to reduce the thermal conductivity of the outer layer for a roll.

The first centrifugally cast outer layer for a roll according to the present invention has a composition comprising, by mass, 4.5-9% of C, 0.1-3.5% of Si, 0.1-3.5% of n, and 18-40% of V, the balance being Fe and inevitable impurity elements.

The first centrifugally cast outer layer for a roll further comprises at least one selected from the group consisting of 1-15% of Cr, 0.5-10% of Mo and 1-40% of W by mass.

Part of V may be substituted by Nb in an amount satisfying the following formula (1):

$$18\% \leq V\% + 0.55 \times Nb\% \leq 40\% \text{ (by mass)} \quad (1).$$

The first centrifugally cast outer layer for a roll preferably satisfies the following formula (2):

$$0 \leq C\% - 0.2 \times (V\% + 0.55 \times Nb\%) \leq 2\% \text{ (by mass)} \quad (2).$$

The first centrifugally cast outer layer for a roll-further comprises 2% or less of Ni and/or 10% or less of Co by mass.

The first centrifugally cast outer layer for a roll preferably further comprises 0.5% or less of Ti and/or 0.5% or less of Al by mass.

The second centrifugally cast outer layer for a roll according to the present invention has a structure having MC carbide dispersed at an area ratio of 20-60% in a matrix having Vickers hardness Hv of 550-900, in which the maximum circle inscribed in a region containing no MC carbide particles, whose equivalent circles have diameters of 15 μm or more, has a diameter not more than 150 μm.

The third centrifugally cast outer layer for a roll according to the present invention having a structure having MC carbide dispersed at an area ratio of 20-60% in a matrix having Vickers hardness Hv of 550-900, in which an average distance between MC carbide particles, whose equivalent circles have diameters of 15 μm or more, is 10-40 μm.

In the second and third centrifugally cast outer layers of rolls, an average diameter of circles equivalent to the MC carbide particles is preferably 10-50 μm. The ratio (B/A) of the average distance B between MC carbide particles, whose equivalent circles have diameters of 15 μm or more, to the average diameter A of circles equivalent to the MC carbide particles is preferably 2 or less.

In the second and third centrifugally cast outer layers of rolls, carbide particles of $M_2C$, $M_6C$ and $M_7C_3$, whose equivalent circles have diameters of 1 μm or more, may be dispersed in a total amount of 0-5% by area.

Each of the second and third centrifugally cast outer layers of rolls preferably has a composition comprising, by mass, 2.5-9% of C, 0.1-3.5% of Si, 0.1-3.5% of Mn, and 11-40% of V, the balance being Fe and inevitable impurity elements.

Each of the second and third centrifugally cast outer layers of rolls preferably further comprises at least one selected from the group consisting of 1-15% of Cr, 0.5-20% of Mo and 1-40% of W by mass.

Part of V may be substituted by Nb in an amount satisfying the following formula (3):

$$11\% \leq V\% + 0.55 \times Nb\% \leq 40\% \text{ (by mass)} \quad (3).$$

Each of the second and third centrifugally cast outer layers of rolls preferably satisfies the following formula (2):

$$0 \leq C\% - 0.2 \times (V\% + 0.55 \times Nb\%) \leq 2\% \text{ (by mass)} \quad (2).$$

Each of the second and third centrifugally cast outer layers of rolls preferably further comprises 2% or less of Ni and/or 10% or less of Co by mass.

Each of the second and third centrifugally cast outer layers of rolls preferably further comprises 0.5% or less of Ti and/or 0.5% or less of Al by mass.

Each of the second and third centrifugally cast outer layers of rolls preferably has an average thermal expansion coefficient of $10 \times 10^{-6}/°$C. or less in a range from room temperature to 300° C. It preferably has thermal conductivity of 25 W/m·K or less at 300° C. It preferably has a modulus of elasticity of 240 Gap or more.

The method of the present invention for producing an outer layer for a roll having a structure having MC carbide dispersed at an area ratio of 20-60%, comprises the steps of (1) centrifugally casting a melt having a composition comprising, by mass, 2.2-6.0% of C, 0.1-3.5% of Si, 0.1-3.5% of Mn, and 8-22% of V, the balance being Fe and inevitable impurity elements, to produce a cylindrical body comprising an inner layer having concentration MC carbide, an MC-carbide-poor outer layer, and an immediate layer (layer having a gradually-changing-concentration of MC carbide) between the inner layer and the outer layer, which is simply called "gradually-changing-concentration layer," and (2) cutting the cylindrical body to a depth at which the area ratio of MC carbide is 20% or more.

The outer layer for a roll obtained by the method of the present invention preferably has a matrix having Vickers hardness Hv of 550-900. In the structure of the outer layer, carbide particles of $M_2C$, $M_6C$ and $M_7C_3$, whose equivalent circles have diameters of 1 μm or more, are preferably dispersed in a total amount of 0-5% by area.

DESCRIPTION OF THE PREFERRED EMBODIMENTS

Figure 1:
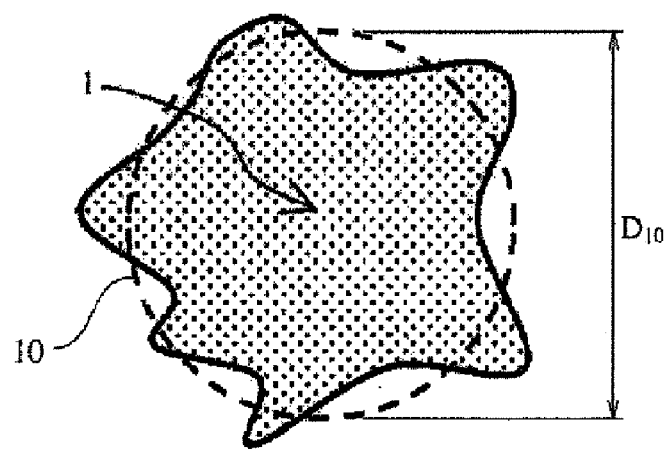
FIG. 1 is a schematic view showing a method for determining a diameter of an equivalent circle of an MC carbide particle.

[1] Composition (% by mass) of Centrifugally Cast Outer Layer of Roll (1) Indispensable Components (a) C: 2.5-9%

C is an indispensable element mainly combined with alloying elements such as V, Nb, etc. to form MC carbide, thereby improving wear resistance. C not combined with the alloying elements is extremely finely dissolved or precipitated mainly in a matrix, thereby strengthening the matrix. When C is less than 2.5%, insufficient MC carbide is formed, failing to achieve sufficient wear resistance. When C exceeds 9%, too much carbide is formed, providing the outer layer for a roll with deteriorated thermal cracking resistance. The C content is preferably 3.5-9%, more preferably 4.5-9%.

(b) Si: 0.1-3.5%

Si functions as a deoxidizer in a melt. When Si is less than 0.1%, insufficient deoxidizing effect is obtained, making it likely that the outer layer has casting defects. When Si exceeds 3.5%, the outer layer for a roll becomes brittle. The Si content is preferably 0.2-2.5%, more preferably 0.2-1.5%.

(c) Mn: 0.1-3.5%

Mn functions to deoxidize the melt and fix S, an impurity, as MnS. When Mn is less than 0.1%, these effects are insufficient. When Mn exceeds 3.5%, the outer layer tends to have residual austenite, failing to stably maintain hardness and thus being likely to have deteriorated wear resistance. The Mn content is preferably 0.2-2.5%, more preferably 0.2-1.5%.

(d) V: 11-40%

V is an element mainly combined with C to form MC carbide. In order that the outer layer for a roll contains a large amount of MC carbide, 11-40% of V is needed. When V is less than 11%, sufficient MC carbide is not formed, failing to obtain sufficient wear resistance. When V is more than 40%, excess MC carbide is formed, providing the outer layer for a roll with deteriorated toughness. The V content is preferably 15-40% or less, more preferably 18-40%.

(e) Nb,

Nb has the same function as that of V in forming MC carbide. Their atomic weight ratio makes 0.55×Nb equivalent to V by mass %. Accordingly, part or all of V may be substituted by Nb in an amount satisfying the following formula (3):

$$11\% \leq V\% + 0.55 \times Nb\% \leq 40\% \text{ (by mass)} \quad (3).$$

The range of (V %+0.55×Nb %) is more preferably 15-40% by mass, most preferably 18-40% by mass.

Nb preferably satisfies with C and V the following formula (2):

$$0 \leq C\% - 0.2 \times (V\% + 0.55 \times Nb\%) \leq 2\% \text{ (by mass)} \quad (2).$$

When the value of [C %−0.2×(V %+0.55×Nb %)] is less than 0, sufficient MC carbide is not formed, resulting in excess V and Nb in the matrix and thus failing to achieve sufficient hardness and wear resistance. When the value of [C %−0.2×(V %+0.55×Nb %)] exceeds 2%, non-granular carbides such as $M_2C$, $M_6C$, $M_7C_3$, etc. are crystallized in a network manner, providing the outer layer for a roll with deteriorated thermal cracking resistance.

(2) Optional Components

Depending on the use of a roll and a method for using a roll, the outer layer may properly contain elements described below.

(a) Cr: 1-15%

Cr is dissolved in the matrix to increase hardenability, and part of Cr is combined with C to precipitate extremely fine carbide, thereby strengthening the matrix. When Cr is less than 1%, a sufficient matrix-strengthening effect is not obtained. When Cr exceeds 15% other carbides than the MC carbide, such as $M_7C_3$ carbide, etc., are crystallized in a network manner, providing the outer layer for a roll with deteriorated thermal cracking resistance. The more preferred Cr content is 3-9%.

(b) Mo: 0.5-20%

Mo is dissolved in the matrix to increase hardenability, and part of Mo is combined with C to extremely precipitate fine carbide, thereby strengthening the matrix. Also, part of Mo forms granular carbide. When Mo is less than 0.5%, a sufficient matrix-strengthening effect is not obtained. When Mo exceeds 20%, non-granular carbides such as $M_2C$, $M_6C$, etc. are crystallized in a network manner, providing the outer layer for a roll with deteriorated thermal cracking resistance. The Mo content is more preferably 2.5-20%, particularly 2.5-10%.

(c) W: 1-40%

W is dissolved in the matrix to increase hardenability, and part of W is combined with C to precipitate extremely fine carbide, thereby strengthening the matrix. Also, part of W forms granular carbide. When W is less than 1%, a sufficient matrix-strengthening effect is not obtained. When W exceeds 40%, non-granular carbides such as $M_6C$, $M_2C$, etc. are crystallized in a network manner, providing the outer layer for a roll with deteriorated thermal cracking resistance. The W content is more preferably 5-40%, particularly 5-20%.

To provide the roll outer layer of the present invention with sufficient wear resistance, it is preferable to add at least one of Cr, Mo and W as a matrix-strengthening element.

(d) Ni: 2% or less

Ni is dissolved in the matrix to effectively improve the hardenability of the matrix. When Ni exceeds 2%, austenite is stabilized in the matrix, resulting in an insufficient matrix-hardening effect.

(e) Co: 10% or less

Co is dissolved in the matrix to strengthen it. The inclusion of Co makes it possible to keep the hardness of the matrix even at high temperatures. When Co exceeds 10%, the outer layer for a roll has reduced toughness. Because Co is expensive, its amount is desirably determined, taking cost and use conditions into consideration.

(f) Ti: 0.5% or less

Ti functions as a deoxidizer in the melt, and is combined with N to form a nitride as a nucleus for granular carbide, thereby making the granular carbide finer. Also, part of Ti is combined with C to form granular carbide. The addition of 0.5% or less of Ti would provide sufficient effects, (g) Al: 0.5% or less Al functions as a deoxidizer in the melt and makes granular carbide finer. When Al exceeds 0.5%, the hardenability of the outer layer is deteriorated, failing to provide the matrix with sufficient hardness.

[2] Structure and Properties of Centrifugally Cast Outer Layer for a Roll (1) MC Carbide Because MC carbide, granular carbide, is higher in hardness than the other carbides such as $M_2C$, $M_6C$, $M_7C_3$, etc., it contributes to improvement of wear resistance. Also, because the MC carbide is stable at high temperatures, unlikely to have metal bonding with a work, it has excellent effect on improving seizure resistance. When the MC carbide is less than 20% by area, sufficient wear resistance, seizure resistance and thermal cracking resistance are not obtained. When the MC carbide exceeds 60% by area, a seizure-resistance-improving effect is saturated, and the toughness of the roll outer layer is remarkably reduced. In addition, it makes adjacent granular carbide particles closer, making the propagation of cracks easier and thus deteriorating thermal cracking resistance. Accordingly, the MC carbide is 20-60% by area, preferably 30-50% by area, (2) Size of MC Carbide The average diameter of circles equivalent to MC carbide particles (granular carbide particles) is preferably 10-50 μm. Because the roll is in contact with a high-temperature steel sheet being hot-rolled, its matrix is softened to a depth of about 10 μm from the surface. Accordingly, when an average diameter of circles equivalent to the MC carbide particles is less than 10 μm, the matrix cannot sufficiently retain the MC carbide, resulting in the roll with low wear resistance and surface roughening resistance. When the average diameter of equivalent circles exceeds 50 μm, a seizure-resistance-improving effect is saturated, resulting in reduced toughness. The average diameter of circles equivalent to the MC carbide particles is more preferably 10-40 μm, most preferably 15-30 μm.

As shown in FIG. 1, the diameter of a circle equivalent to an MC carbide particle 1 defined as a diameter $D_{10}$ of a circle 10 having the same area as that of the MC carbide particle 1. Assuming that the MC carbide particle 1 has an area S, $D_{10}=2\times(S/\pi)^{1/2}$. The average diameter of circles equivalent to the MC carbide particles is an average of $D_{10}$.

(3) Average Distance between MC Carbide Particles

In the structure of the roll outer layer of the present invention, an average distance between MC carbide particles, whose equivalent circles have diameters of 15 μm or more, is preferably 10-40 μm. When the average distance between MC carbide particles is less than 10 μm, too much segregation of the MC carbide occurs, resulting in MC carbide-rich portions and MC carbide-poor portions. Their wear difference generates microscopic roughness, resulting in low surface roughening resistance. When the average distance between MC carbide particles is more than 40 μm, there is non-negligible unevenness in the distribution of MC carbide particles failing to achieve the improvement seizure resistance. The average distance between carbide particles, whose equivalent circles have diameters of 15 μm or more, is more preferably 20-30 μm.

Figure 2:
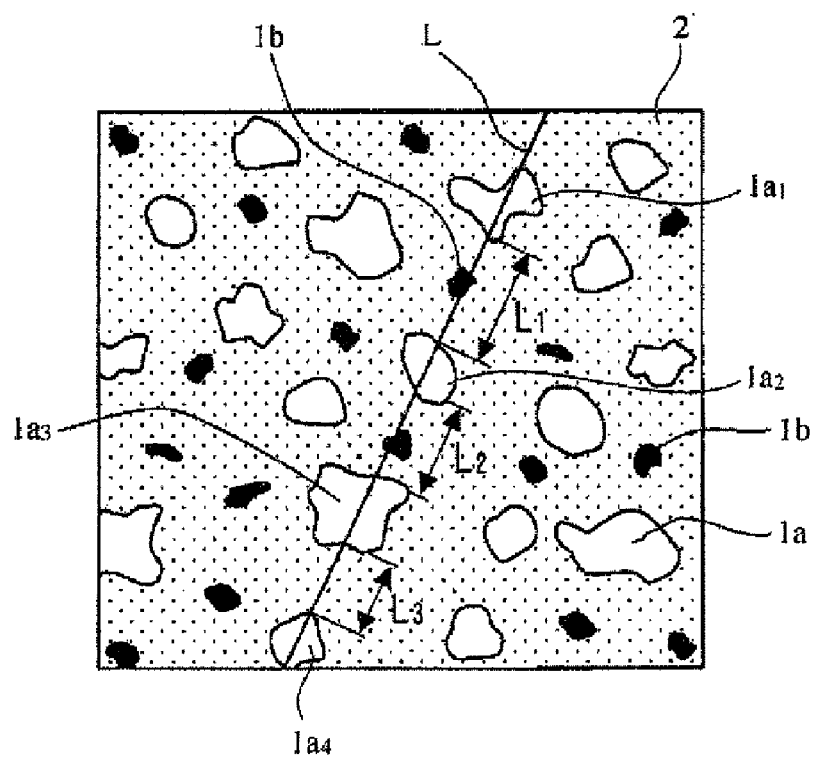
FIG. 2 is a schematic view showing a method for determining an average distance between MC carbide particles.

The determination of the average distance between MC carbide particles will be explained, referring to FIG. 2 schematically indicating the structure of the outer layer for a roll. This structure contains MC carbide particles (white) $1a$ of 15 μm or more in diameters of equivalent circles, and MC carbide particles (black) $1b$ of less than 15 μm in diameters of equivalent circles. 2 denotes a matrix containing carbides of $M_2C$, $M_6C$ and $M_7C_3$. A straight line L arbitrarily drawn on this structure intersects MC carbide-particles $1a_1$, $1a_2$, $1a_3$ ... $1an$, so that the distances $L_1, L_2, L_3$ ... Ln of these MC carbide particles are calculated. Accordingly, an average distance between MC carbide particles, whose equivalent circles have diameters of 15 μm or more, is determined by $(L_1+L_2+...+Ln)/n$.

(4) Average Distance between MC Carbide Particles/Average Diameter of Equivalent Circles In the structure of the roll outer layer of the present invention, the ratio (B/A) of the average distance B between MC carbide particles, whose equivalent circles have diameters of 15 μm or more, to the average diameter A of circles equivalent to the MC carbide particles is preferably 2 or less. MC carbide particles are easily aggregated in the roll outer layer of the present invention containing a large amount of MC carbide. The aggregation of MC carbide particles generates MC carbide-rich portions and MC carbide-poor portions, and their wear difference provides microscopic roughness, resulting in poor surface roughening resistance. The B/A ratio is a measure of how much MC carbide particles are aggregated. When B/A exceeds 2, the MC carbide particles are too much aggregated. The more preferred B/A ratio is 1.5 or less.

(5) Diameter of Maximum Circle Inscribed in Region Containing no MC Carbide Particles In the structure of the roll outer layer of the present invention, the diameter of the maximum circle inscribed in a region containing no MC carbide particles, whose equivalent circles have diameters of 15 μm or more, is preferably not more than 150 μm. When the diameter of the maximum inscribed circle is more than 150 μm, there is non-negligibly large unevenness in the MC carbide distribution. The diameter of the maximum inscribed circle is preferably 120 μm or less, more preferably 80 μm or less.

Figure 3:
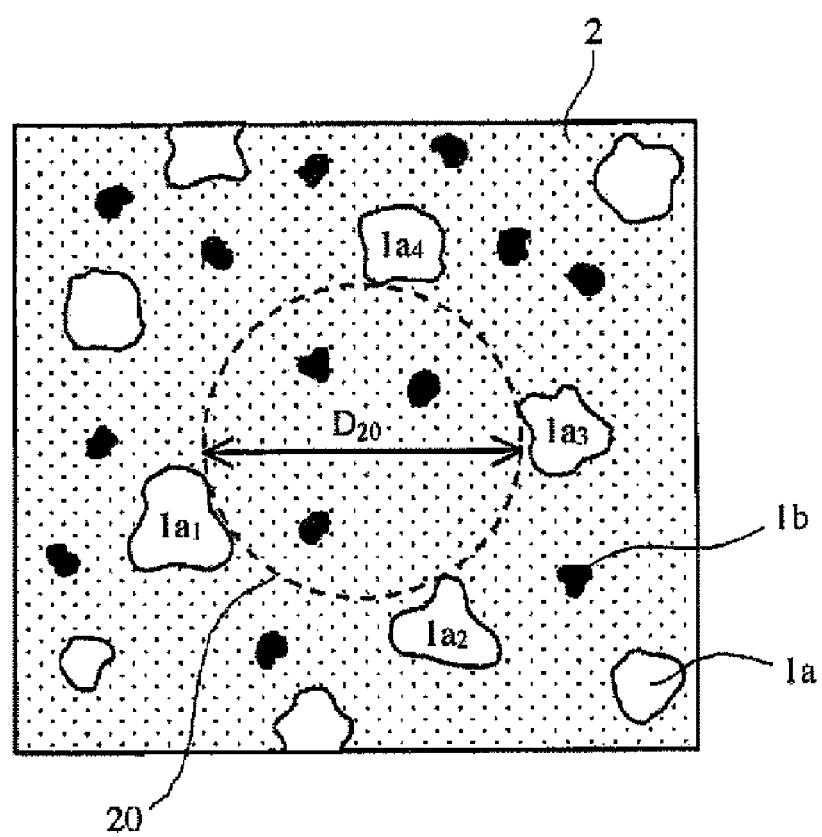
FIG. 3 is a schematic view showing a method for determining a diameter of the maximum circle inscribed in a region containing no MC carbide particles.

The diameter of the maximum circle inscribed in a region containing no MC carbide particles, whose equivalent circles have diameters of 15 μm or more, is determined as shown in FIG. 3. In the depicted field, a circle 20 inscribed in MC carbide particles $1a_1$, $1a_2$, $1a_3$, $1a_4$, whose equivalent circles have diameters of 15 μm or more, has a diameter $D_{20}$. In the same manner, the diameters of circles inscribed in the other MC carbide particles are determined. this operation is conducted in pluralities of arbitrary fields to determine the diameter $D_{20max}$ of the maximum inscribed circle.

(6) Hardness of Matrix

The matrix is mainly composed of Fe and alloying elements, and its hardness changes depending on transformation and the precipitation of extremely fine carbide by heat treatment. When the matrix hardness is less than 550 in Vickers hardness Hv, the outer layer for a roll has insufficient wear resistance. To improve wear resistance, a harder matrix is more preferable, but when it is harder than Hv 900, the matrix has reduced toughness. The hardness of the matrix is more preferably Hv 650-850, further preferably Hv 650-750.

(7) Average Thermal Expansion Coefficient

The roll outer layer of the present invention has an average thermal expansion coefficient of $10\times10^{-6}$/° C. or less in a range from room temperature to 300° C. Because the MC carbide has a smaller thermal expansion coefficient than those of the other carbides, it is effective to reduce the thermal expansion coefficient of the outer layer. Particularly VC has an average thermal expansion coefficient of about $7 \times 10^{-6}/°$ C. in a range from room temperature to 300° C., smaller than about $10 \times 10^{-6}/°$ C. owned by $Cr_{23}C_6$, a Cr carbide. A small average thermal expansion coefficient suppresses the growth of thermal crown. However, if the outer layer has too small a thermal expansion coefficient, the roll has too much residual stress, resulting in higher risk of the fracture and peeling of an outer layer. The average thermal expansion coefficient in a range from room temperature to 300° C. is more preferably $9.5 \times 10^{-6}/°$ C. or less, most preferably $8\text{-}9.5 \times 10^{-6}/°$ C.

(8) Thermal Conductivity

The roll outer layer of the present invention preferably has thermal conductivity of 25 W/m·K or less at 300° C. The thermal conductivity of the MC carbide is much lower than that of the Fe matrix. For instance, the thermal conductivity of VC is about 4 W/m·K, extremely lower than about 30-50 W/m·K of the Fe matrix. Accordingly, the dispersion of 20-60% by area of MC carbide in the metal structure reduces temperature elevation near a longitudinal center portion of the roll, thereby suppressing the growth of thermal crown and making easier the passing of a sheet being rolled. The thermal conductivity at 300° C. is more preferably 23 W/m·K or less, most preferably 21 W/m·K or less.

(9) Modulus of Elasticity

Because the MC carbide has higher modulus of elasticity than Fe, the inclusion of a large amount of MC carbide increases the modulus of elasticity of the roll outer layer. For instance, VC has modulus of elasticity of about 270 GPa, NbC about 340 CPa, and the matrix about 200-220 GPa.

(10) Non-granular Carbide

In the roll outer layer of the present invention, non-granular carbides such as $M_2C$, $M_6C$ and $M_7C_3$, whose equivalent circles have diameters of 1 µm or more, may be dispersed in a total amount of 0-5% by area. When the non-granular carbide exceeds 5% by area in total, coarse non-granular carbide particles deteriorate the surface roughening resistance and toughness of the roll, and cracks propagate along non-granular carbides crystallized in a network manner, resulting in reduced thermal cracking resistance. A smaller total area ratio of non-granular carbides provides better results. The total area ratio of $M_2C$, $M_6C$ and $M_7C_3$ carbides, whose equivalent circles have diameters of 1 µm or more, is more preferably 0-3%, further preferably 0-1%. Incidentally, other carbides than MC, $M_2C$, $M_6C$ and $M_7C_3$ may be contained in trace amounts.

[3] Centrifugal Casting Method

To produce the roll outer layer of the present invention, a melt having a chemical composition adjusted to crystallize a primary crystal of MC carbide is charged into a cylindrical mold, and centrifugally cast. In the present invention utilizing the centrifugal separation of MC carbide by centrifugal casting, the melt composition differs from the composition of the outer layer of roll. To obtain the outer layer composition described in [1], the melt composition comprises, by mass, 2.2-6.0% of C, 0.1-3.5% of Si, 0.1-3.5% of Mn, and 8-22% of V, the balance being Fe and inevitable impurity elements. Because Nb substituting part of V is centrifugally separated as MC carbide by centrifugal casting, Nb may be added to the melt in an amount satisfying the following formula (4):

$$8\% \leq V\% + 0.55 \times Nb\% \leq 22\% \text{ (by mass)} \quad (4).$$

The melt composition preferably comprises, by mass, 2.5-6.0% of C, 0.2-1.5% of Si, 0.2-1.5% of Mn, and 10-22% of V, and may contain Nb in an amount satisfying the formula of $10\% \leq V\% + 0.55 \times Nb\% \leq 22\%$ (by mass).

Because Cr, Mo, Ni, Co and Al, optional elements, are subjected to substantially no centrifugal separation, their amounts in the melt may be the same as in the outer layer for a roll. W and Ti are slightly centrifugally separated, because part of W and Ti are dissolved in primarily crystallized MC carbide.

Figure 4A:
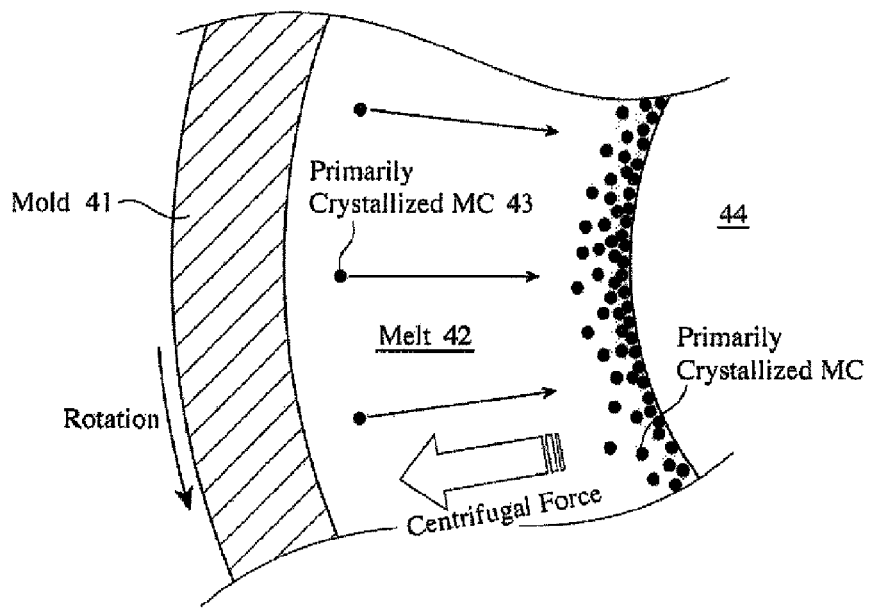
FIG. 4(a) is a schematic view showing the inward migration of MC carbide during centrifugal casting.
Figure 4B:
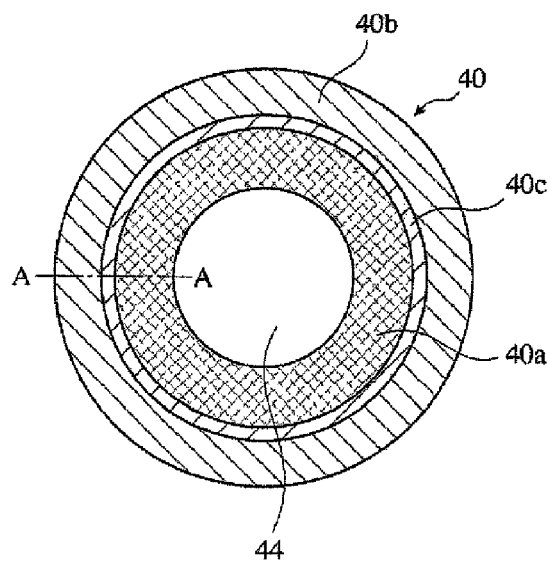
FIG. 4(b) is a radial cross-sectional view showing a centrifugally cast outer layer for a roll according to the present invention.
Figure 4C:
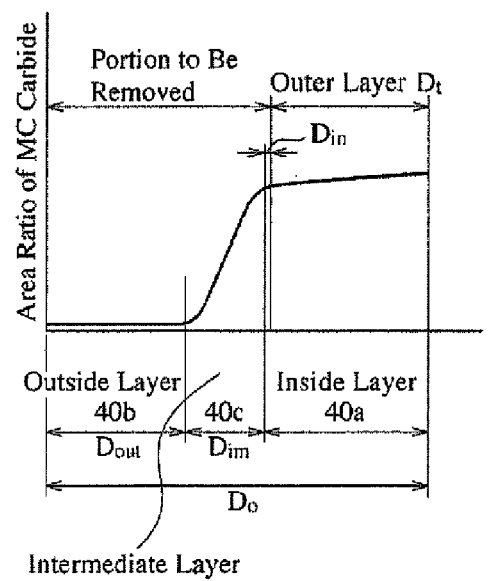
FIG. 4(c) is a graph showing the distribution of MC carbide in a cross section taken along the line A-A in FIG. 4(b).

As shown in FIG. 4(a), primarily crystallized MC carbide 43 having a small specific gravity moves in the melt 42 toward an inner surface facing a hollow portion 44, during centrifugal casting in a mold 41. As shown in FIGS. 4(b) and 4(c), formed is a cylindrical body 40 comprising an inside layer having concentrated MC carbide 40a, an MC-carbide-poor outside layer 40b, and a concentration gradient layer 40c in which the area ratio of MC carbide gradually changes. All of the outside layer 40b and part of the concentration gradient layer 40c are then removed from the cylindrical body 40 by cutting, etc., to use a portion in which the MC carbide is concentrated (mainly inside layer 40a) as an outer layer for a roll.

Because the thickness of the outside layer 40b and the concentration gradient layer 40c is determined by a melt composition and centrifugal casting conditions, it can be predicted. Because all of the concentration gradient layer 40c need no be removed, it is determined in advance how deep the concentration gradient layer 40c is removed. To surely obtain high wear resistance, part of the inside layer 40a may of course be removed. As shown in FIG. 4(c), if experiment or simulation based on a melt composition and centrifugal casting conditions, for instance, determines the thickness Dout of the outside layer 40b to be completely removed, the depth Dim of the concentration gradient layer 40c to be at least partially removed, and the depth Din of the inside layer 40a to be partially removed if necessary, the thickness Do[=Dt+Dout+Dim(+Din)] of the cylindrical body 40 can be determined in advance, such that an inside layer 40a (or an inside layer 40a+part of a concentration gradient layer 40c) exposed by cutting the cylindrical body 40 to a depth of Dout+Dim(+Din) has a desired thickness (target thickness of the outer layer) Dt. Once the cylindrical body 40 having a larger thickness Do than the target thickness Ut of the outer layer is formed by a centrifugal casting method using an existing mold 41, a roll outer layer having a thickness Dt can be produced easily at a low cost by cutting the cylindrical body 40 to a depth of Dout+Dim(+Din).

In the method of the present invention, with a depth, at which the area ratio of MC carbide is 20% or more, calculated from the distribution of the MC carbide expected by the melt composition and centrifugal casting conditions, it is preferable to produce a cylindrical body having a larger outer diameter than the target outer diameter of the outer layer by the cutting depth.

[4] Inner Layer Material

In a roll having the outer layer of the present invention, an inner layer is preferably made of an alloy having a lower melting point than the outer layer to achieve good bonding with the outer layer. Specifically, the inner layer alloy is preferably cast iron such as spheroidal graphite cast iron, flake graphite cast iron, etc., or graphite steel. In a composite roll, an intermediate layer may be disposed between the outer layer and the inner layer. Specifically, the intermediate layer may be formed by Adamite, etc. As long as the roll has the outer layer of the present invention, it may be either solid or hollow. A sleeve constituted by the outer layer of the present invention may be fit onto a shaft.

The inner layer material is not particularly restricted. For instance, when the inner layer is made of steel having a modulus of elasticity of about 210 GPa, the entire roll has high rigidity by a synergy with the outer layer having a high modulus of elasticity. Also, when the inner layer is made of ductile cast iron having a modulus of elasticity of about 180 GPa, sheet shape control can be easily conducted by roll bending, etc. even when combined with the outer layer having a high modulus of elasticity. Thus, the inner layer material may be properly selected depending on applications and objects.

The present invention will be explained in more detail referring to Examples below without intention of restricting the scope of the present invention.

EXAMPLES 1-8, COMPARATIVE EXAMPLES 1-3, CONVENTIONAL EXAMPLE 1 and 2

Each melt having a chemical composition (% by mass) shown in Table 1 was centrifugally cast in a centrifugal casting mold to produce a cylindrical body. However, a stationary casting method was used only in Comparative Example 1.

TABLE 1

| No. | Melt Composition (% by mass) | | | | | | |
|---|---|---|---|---|---|---|---|
| | C | Si | Mn | V | Nb | Cr | Mo |
| Example 1 | 4.5 | 0.7 | 0.5 | 19.0 | — | 8.8 | — |
| Example 2 | 3.1 | 0.2 | 0.9 | 11.5 | 2.2 | — | 2.2 |
| Example 3 | 2.4 | 0.4 | 0.7 | — | 14.7 | 11.4 | 2.0 |
| Example 4 | 4.4 | 0.9 | 0.7 | 17.3 | — | 4.6 | 5.3 |
| Example 5 | 4.7 | 0.3 | 0.3 | 18.0 | — | 2.5 | 8.5 |
| Example 6 | 2.8 | 0.2 | 0.9 | 7.7 | 1.7 | — | 2.3 |
| Example 7 | 3.2 | 0.4 | 0.7 | — | 14.5 | 11.6 | 2.0 |
| Example 8 | 2.6 | 0.7 | 0.5 | 11.6 | — | 8.8 | — |
| Com. Ex. 1 | 4.3 | 1.0 | 0.5 | 19.3 | — | 4.1 | 0.3 |
| Com. Ex. 2 | 2.0 | 1.5 | 0.2 | 21.7 | — | — | 2.4 |
| Com. Ex. 3 | 5.1 | 0.4 | 0.6 | 9.4 | — | 15.9 | 2.4 |
| Conv. Ex. 1 | 3.0 | 2.0 | 0.5 | 5.0 | — | 2.0 | 1.0 |
| Conv. Ex. 2 | 2.0 | 0.8 | 0.4 | 5.3 | — | 6.7 | 2.7 |

| No. | Melt Composition (% by mass) | | | | |
|---|---|---|---|---|---|
| | W | Ni | Co | Ti | Al |
| Example 1 | 12.0 | 1.5 | — | — | — |
| Example 2 | 3.2 | — | — | — | — |
| Example 3 | 1.5 | — | — | — | 0.15 |
| Example 4 | 19.3 | — | — | — | — |
| Example 5 | — | — | 4.7 | 0.05 | — |
| Example 6 | 3.2 | — | — | — | — |
| Example 7 | 1.5 | — | — | — | — |
| Example 8 | 12.0 | 1.5 | — | — | 0.11 |
| Com. Ex. 1 | — | 0.6 | — | — | — |
| Com. Ex. 2 | — | — | — | — | — |
| Com. Ex. 3 | — | — | — | — | — |
| Conv. Ex. 1 | 1.0 | 4.0 | — | — | — |
| Conv. Ex. 2 | 2.4 | 0.6 | — | — | — |

Among the resultant cylindrical bodies, those of Examples 4 and 6 and Conventional Example 2 were measured with respect to the distributions of elements and MC carbide in their radial cross sections. The results are shown in FIGS. 5-10.

Figure 5:
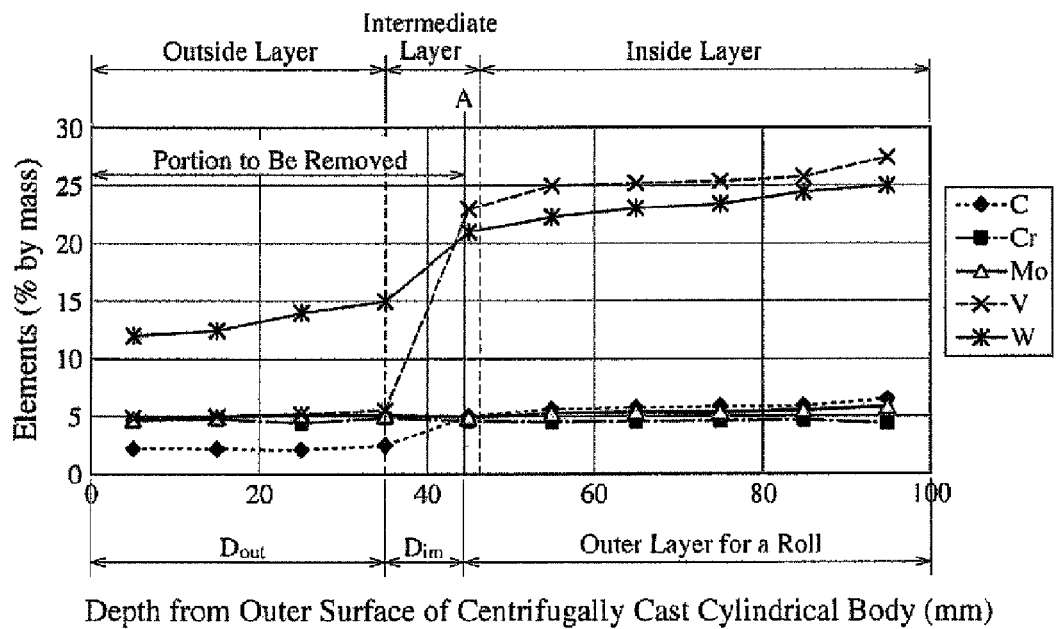
FIG. 5 is a graph showing the radial distribution of elements in the centrifugally cast cylindrical body of Example 4.
Figure 6:
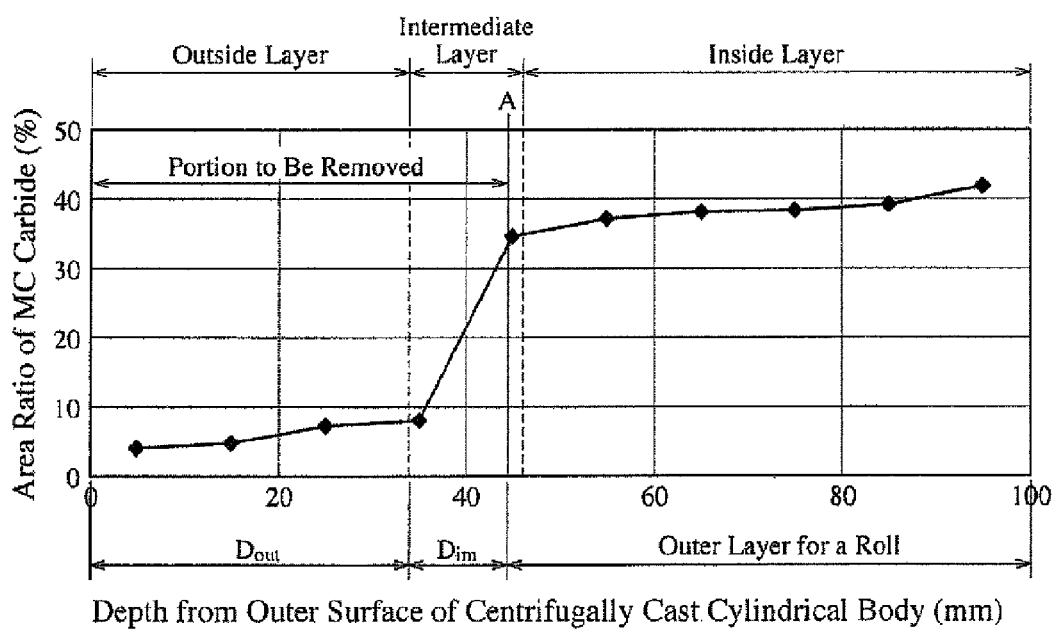
FIG. 6 is a graph showing the radial distribution of MC carbide in the centrifugally cast cylindrical body of Example 4.

As shown in FIG. 5, in the cylindrical body of Example 4, the amount of V was as small as substantially 5% by mass in the outer layer but as much as 25% or more by mass in the inner layer, and the amount of W was as small as substantially 10-15% by mass in the outer layer but as much as 20-25% by mass in the inner layer. The amount of C was also as small as substantially 2.5% by mass in the outer layer but as much as 5% or more by mass in the inner layer. With respect to the other elements (Cr, Mo), there was substantially no concentration distribution from the outer layer to the inner layer. As shown in FIG. 6, the area ratio distribution of MC carbide had substantially the same tendency as that of the concentration distribution of V. That is, the area ratio of MC carbide was as small as substantially 4-8% in the outer layer, while it was as much as substantially 35% or more in the inner layer. Accordingly, for instance, the cylindrical body was cut to a depth including all of the outer layer and a most portion of the concentration gradient layer (shown by the line A in the figure), to use a portion containing 35% or more by area of MC carbide as an outer layer for a roll.

Figure 7:
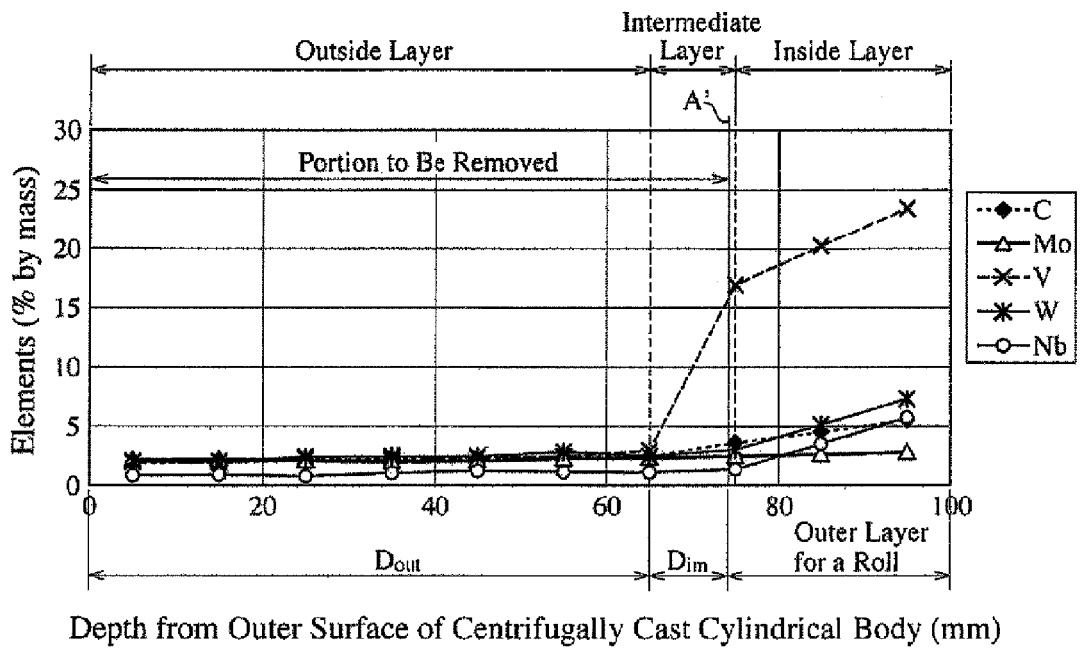
FIG. 7 is a graph showing the radial distribution of elements in the centrifugally cast cylindrical body of Example 6.
Figure 8:
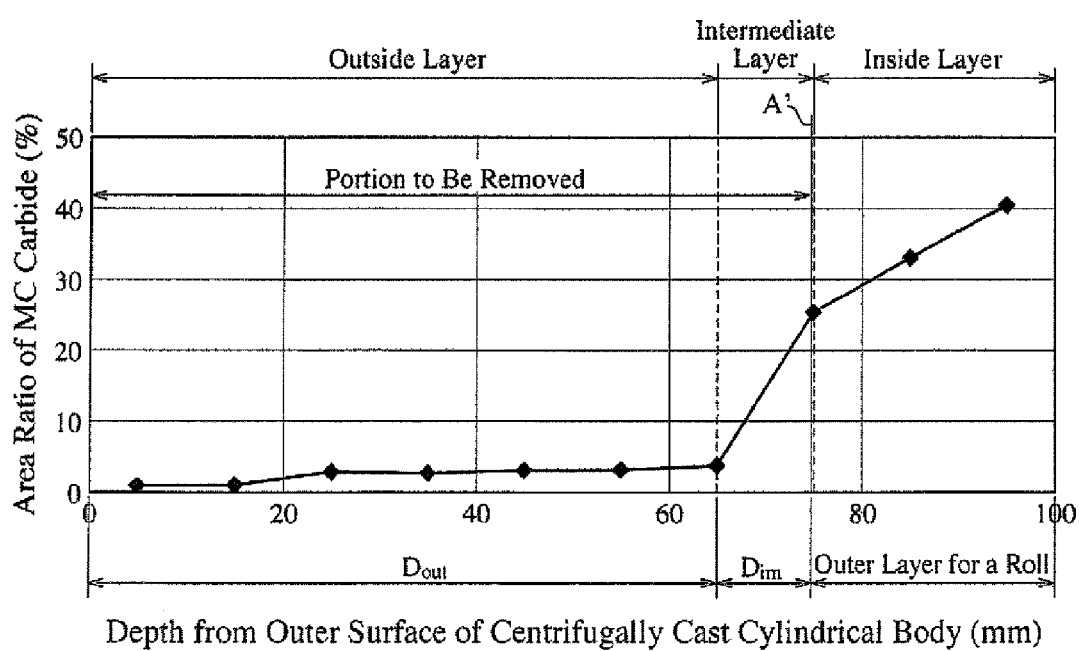
FIG. 8 is a graph showing the radial distribution of MC carbide in the centrifugally cast cylindrical body of Example 6.

As shown in FIG. 7, in the cylindrical body of Example 6, the amount of V was as small as substantially 6% by mass or less in the outer layer but as much as 15% or more by mass in the inner layer, and the amounts of C, Nb and W were as small as substantially 5% by mass or less in the outer layer but slightly as much as 8% or more by mass in the inner layer. With respect to Mo, there was substantially no concentration distribution from the outer layer to the inner layer. As shown in FIG. 8, the area ratio of MC carbide was as small as substantially 4% or less by area in the outer layer but as much as substantially 25% or more in the inner layer. Accordingly, for instance, the cylindrical body was cut to a depth including all of the outer layer and a most portion of the concentration gradient layer (shown by the line A in the figure), to use a portion containing 25% or more by area of MC carbide as an outer layer for a roll.

Figure 9:
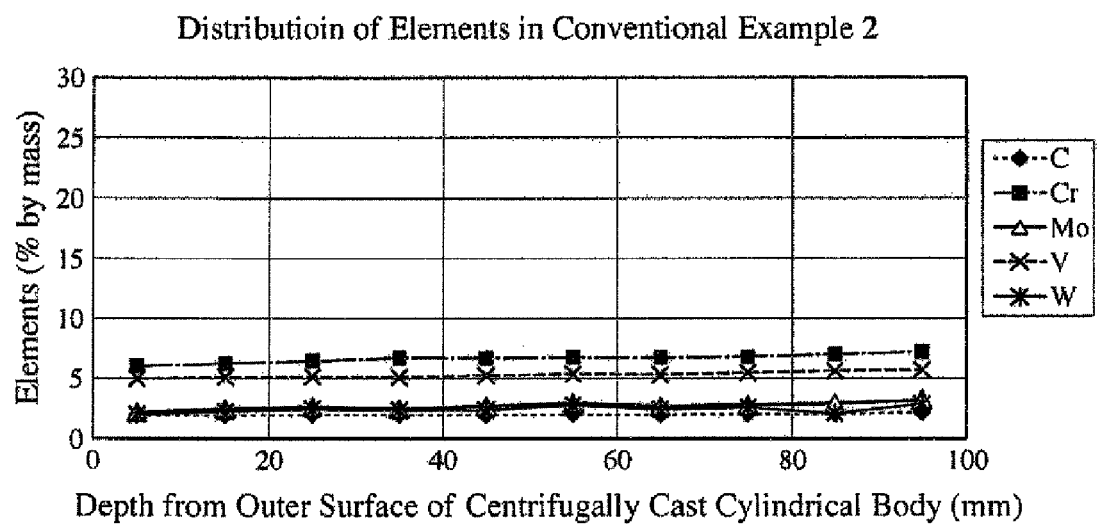
FIG. 9 is a graph showing the radial distribution of elements in the centrifugally cast cylindrical body of Conventional Example 2.
Figure 10:
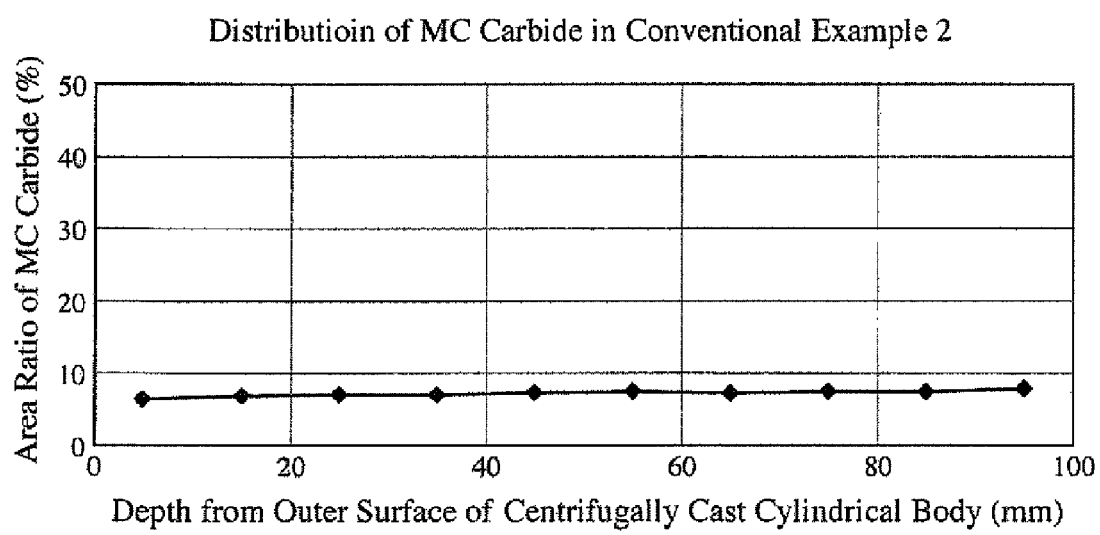
FIG. 10 is a graph showing the radial distribution of MC carbide in the centrifugally cast cylindrical body of Conventional Example 2.

In the cylindrical body of Conventional Example 2, as shown in FIGS. 9 and 10, there were substantially no concentration distributions of elements between the outer layer and the inner layer. The MC carbide was substantially 8% or less by area at any depth.

Like the cylindrical bodies of Examples 4 and 6, the cylindrical bodies of other Examples were cut until portions containing concentrated MC carbide were exposed, to produce centrifugally cast roll outer layers.

The compositions of the resultant roll outer layers are shown in Table 2. Each roll outer layer was subjected to a heat treatment comprising a hardening step at 1000-1200° C. and three annealing steps at 500-600° C. However, the roll outer layer of Conventional Example 1 was subjected to a heat treatment at 400-500° C. to decompose residual austenite and remove strain.

TABLE 2

| No. | Composition of Roll Outer Layer (% by mass) | | | | | | |
|---|---|---|---|---|---|---|---|
| | C | Si | Mn | V | Nb | Cr | Mo |
| Example 1 | 6.8 | 0.6 | 0.5 | 31.5 | — | 8.8 | — |
| Example 2 | 4.7 | 0.2 | 0.8 | 19.6 | 5.5 | — | 2.3 |
| Example 3 | 4.9 | 0.4 | 0.6 | — | 37.5 | 12.9 | 2.2 |
| Example 4 | 5.8 | 0.8 | 0.6 | 25.3 | — | 4.6 | 5.4 |
| Example 5 | 8.1 | 0.3 | 0.3 | 34.8 | — | 2.5 | 8.7 |
| Example 6 | 4.5 | 0.2 | 0.8 | 20.3 | 3.5 | — | 2.6 |
| Example 7 | 4.9 | 0.4 | 0.6 | — | 27.4 | 12.9 | 2.2 |
| Example 8 | 3.4 | 0.6 | 0.5 | 15.7 | — | 8.8 | — |
| Com. Ex. 1 | 4.3 | 1.0 | 0.5 | 19.3 | — | 4.1 | 0.3 |
| Com. Ex. 2 | 2.0 | 1.5 | 0.2 | 21.7 | — | — | 2.4 |
| Com. Ex. 3 | 5.1 | 0.4 | 0.6 | 9.4 | — | 15.9 | 2.4 |
| Conv. Ex. 1 | 3.0 | 2.0 | 0.5 | 5.0 | — | 2.0 | 1.0 |
| Conv. Ex. 2 | 2.0 | 0.8 | 0.4 | 5.3 | — | 6.7 | 2.7 |

| No. | Composition of Roll Outer Layer (% by mass) | | | | | | |
|---|---|---|---|---|---|---|---|
| | W | Ni | Co | Ti | Al | Formula (1) | Formula (2) |
| Example 1 | 15.4 | 1.2 | — | — | — | 31.5 | 0.5 |
| Example 2 | 4.9 | — | — | — | — | 22.6 | 0.2 |

TABLE 2-continued

| | | | | | | | |
|---|---|---|---|---|---|---|---|
| Example 3 | 1.9 | — | — | — | 0.13 | 20.6 | 0.8 |
| Example 4 | 23.2 | — | — | — | — | 25.3 | 0.7 |
| Example 5 | — | — | 4.7 | 0.15 | — | 34.8 | 1.1 |
| Example 6 | 5.2 | — | — | — | — | 22.2 | 0.1 |
| Example 7 | 1.9 | — | — | — | — | 15.1 | 1.9 |
| Example 8 | 15.4 | 1.2 | — | — | 0.11 | 15.7 | 0.3 |
| Com. Ex. 1 | — | 0.6 | — | — | — | 19.3 | 0.4 |
| Com. Ex. 2 | 6.8 | 2.3 | 8.3 | 0.11 | 0.23 | 21.7 | −2.3 |
| Com. Ex. 3 | — | — | — | — | — | 9.4 | 3.2 |
| Conv. Ex. 1 | 1.0 | 4.0 | — | — | — | 5.0 | 2.0 |
| Conv. Ex. 2 | 2.4 | 0.6 | — | — | — | 5.3 | 0.9 |

Note:
The formula (1) represents the value of (V % + 0.55 × Nb %), and the formula (2) represents the value of [C % − 0.2 × (V % + 0.55 × Nb %)] by mass.

A test piece cut out of each roll outer layer was measured with respect to the area ratio (%) of MC carbide, the total area ratio (%) of $M_2C$, $M_6C$ and $M_7C_3$, whose equivalent circles had diameters of 1 μm or more, an average diameter (μm) of circles equivalent to the MC carbide particles, an average distance (μm) between MC carbide particles, whose equivalent circles had diameters of 15 μm or more, a diameter (μm) of the maximum circle inscribed in a region containing no MC carbide particles, whose equivalent circles had diameters of 15 μm or more, the Vickers hardness (Hv) of the matrix, wear depth (μm), surface roughness Rz (μm), a seizure area ratio (%), fracture toughness KIC (kg/mm$^{3/2}$), an average thermal expansion coefficient (×10$^{-6}$/° C.), thermal conductivity (W/m·K), and a modulus of elasticity (GPa) by the following methods. The measurement results are shown in Table 3.

(1) Area Ratio of MC Carbide

Each test piece was mirror-finished, and electrolytically etched with an aqueous solution of potassium dichromate to turn MC carbide black. Using an image analyzer (SPICCA-II available from Nippon Avionics Co., Ltd.), 20 arbitrary fields each corresponding to an area of 0.23 mm×0.25 mm in each test piece were observed to measure the area ratio (%) of MC carbide, and the measured values were averaged.

(2) Total Area Ratio of Non-granular Carbides ($M_2C$, $M_6C$ and $M_7C_3$)

Each test piece was mirror-finished, and etched with Murakami's reagent to turn carbides of $M_2C$, $M_6C$ and $M_7C_3$ black or gray. Using the above image analyzer, 20 arbitrary fields each corresponding to an area of 0.23 mm×0.25 mm in each test piece were observed to measure the total area ratio (%) of carbides of $M_2C$, $M_6C$ and $M_7C_3$, and the measured values were averaged. Measurement was conducted on easily discernible carbides of $M_2C$, $M_6C$ and $M_7C_3$, whose equivalent circles had diameters of 1 μm or more.

(3) Average Diameter of Circles Equivalent to MC Carbide Particles

Each test piece was mirror-finished, and electrolytically etched with an aqueous solution of potassium dichromate to turn MC carbide black. Using the above image analyzer, 20 arbitrary fields each corresponding to an area of 0.23 mm×0.25 mm in each test piece were observed to measure the average diameter (μm) of circles equivalent to the above MC carbide particles, and the measured values were averaged.

(4) Average Distance between MC Carbide Particles

Each test piece was mirror-finished, and its matrix was etched with a picric alcohol solution. In optical microscopic observation (200 times), the matrix appeared dark gray with light gray MC carbide and white carbides of $M_2C$, $M_6C$ and $M_7C_3$. 20 arbitrary fields each corresponding to an area of 1.0 mm×1.15 mm in each test piece were observed to measure the average distance (μm) between MC carbide particles, whose equivalent circles had diameters of 15 μm or more, and the measured values were averaged.

(5) Diameter of Maximum Circle Inscribed in Region Containing No MC Carbide 20 arbitrary fields each corresponding to an area of 2.0 mm×3.0 mm in each test piece etched as in (4) were observed by an optical microscope (100 times) to measure the diameter (μm) of the maximum circle inscribed in each region containing no MC carbide particles, whose equivalent circles had diameters of 15 μm or more, and the measured values were averaged.

(6) Vickers Hardness of Matrix

Each test piece was mirror-finished and lightly etched with a picric ethanol solution. Using a Vickers hardness test machine, the Vickers hardness (Hv) of the test piece was measured in a load range of 50-200 g at five arbitrary points, and the measured values were averaged.

(7) Wear Depth and Surface Roughness Rz

Figure 11:
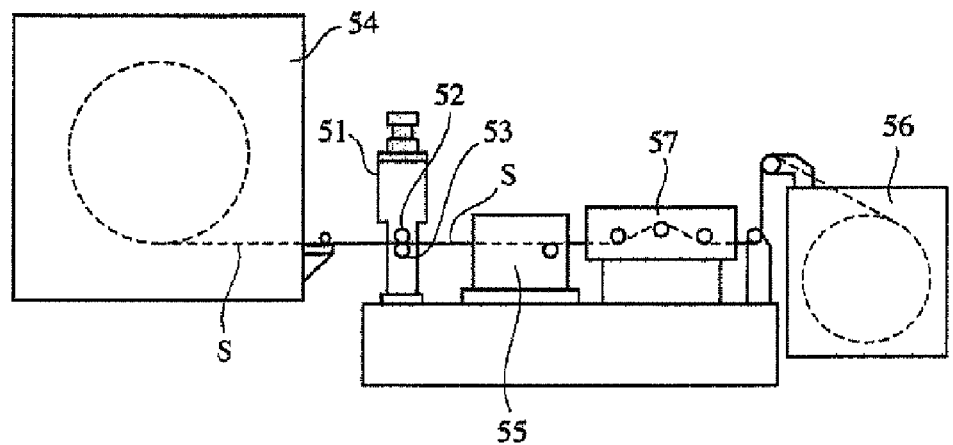
FIG. 11 is a schematic view showing a rolling wear test machine.

To evaluate wear resistance and surface roughening resistance, using a rolling wear test machine schematically shown in FIG. 11, wear depth (μm) and ten-point average surface roughness Rz were measured on a roll used for rolling by the following methods. The surface roughness Rz was measured by a contact-stylus roughness meter.

The rolling wear test machine comprises a rolling mill 51 equipped with test rolls 52, 53 each constituted by a small sleeve roll of 60 mm in outer diameter, 40 mm in inner diameter and 40 mm in width, which was produced in Examples 1-8, Comparative Examples 1-3, and Conventional Example 1 and 2, a furnace 54, a cooling water bath 55, a reel 56, and a tension controller 57. The rolling wear test conditions were as follows:

Rolled material S: SUS304,
Rolling reduction: 25%,
Rolling speed: 150 m/minute,
Rolling temperature: 900° C.,
Rolling distance: 300 m,
Cooling of roll: by water, and
Number of rolls: 4.

(8) Area Ratio of Seizure

Figure 12:
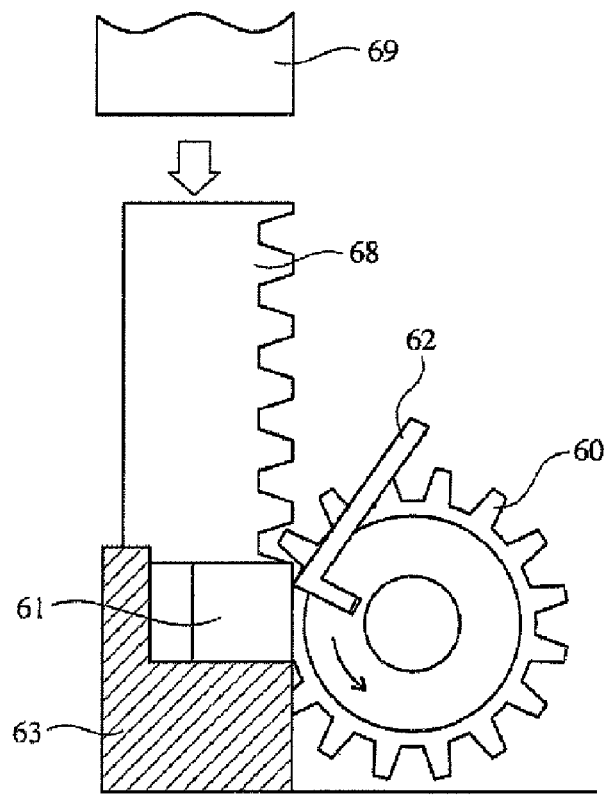
FIG. 12 is a schematic view showing a seizure test machine.

A seizure test machine schematically shown in FIG. 12 comprises a table 63 on which a test piece 61 is placed, a rack 68 whose lower end abuts an upper surface of the test piece 61, a pinion 60 engageable with the rack 68, a weight 69 falling onto the rack 68, and a seizure member 62 made of mild steel, which bites the test piece 61 by the rotation of the pinion 60. When the weight 69 of 100 kg falls onto the rack 68 in this test machine, the pinion 60 is rotated, so that the seizure member 62 is strongly pressed to the test piece 61. As a result, the test piece 61 is dented and seized with the member 62. An area ratio of seizure in the test piece 61 is calculated by (seizure area)/(dent area) (%). This seizure test was conducted twice on each test piece, and the measured seizure area ratios were averaged.

(9) Fracture Toughness KIC

The fracture toughness KIC of each test piece was measured according to ASTM E399. Measurement was conducted on two test pieces, and the measured values were averaged.

(10) Average Thermal Expansion Coefficient

Using a thermal stress-strain-measuring apparatus (SSC/5200 available from Seiko Instruments Inc.), the average thermal expansion coefficient of each test piece of 8 mm×8 mm×17 mm was measured in a range from room temperature to 300° C.

(11) Thermal Conductivity

The thermal conductivity of each test piece of 10 mm in diameter and 1 mm in thickness was measured at 300° C. by a laser flash method.

(12) Modulus of Elasticity

The modulus of elasticity of each test piece of 10 mm in width, 60 mm in length and 1.5 mm in thickness was measured by a free-resonance, intrinsic vibration method.

$0.55 \times Nb\%$) was about 15% or more by mass, the area ratio of MC carbide was about 20% or more.

Figure 17:
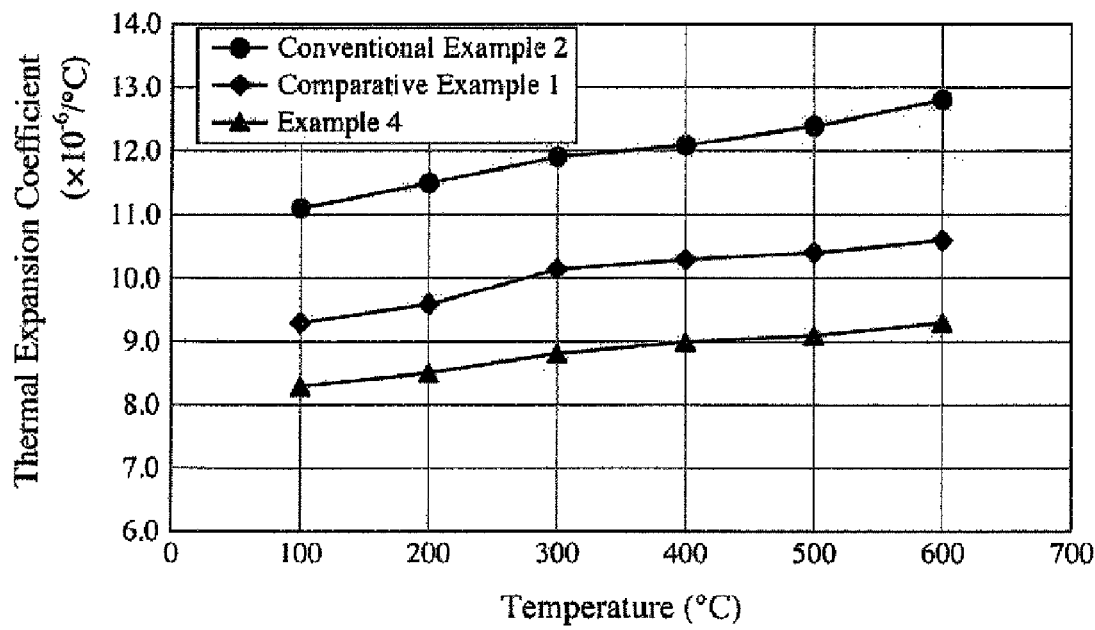
FIG. 17 is a graph showing the relation between a thermal expansion coefficient and a temperature in the test pieces of Example 4, Comparative Example 1 and Conventional Example 2.

FIG. 17 shows the thermal expansion coefficients of Example 4, Comparative Example 1 and Conventional Example 2 from 100° C. to 600° C. In the figure, the abscissa axis represents a temperature (° C.), and the ordinate axis represents an average thermal expansion coefficient ($\times 10^{-6}$/° C.) from room temperature to each temperature. The

TABLE 3

| No. | Area Ratio of MC Carbide (%) | Area Ratio of Non-Granular Carbide (%) | Average Equivalent Circuit Diameter A (μm) | Average Particle Distance B (μm) | Maximum Inscribed Circle Diameter (μm) | B/A[(1)] | Matrix Hardness (Hv) |
|---|---|---|---|---|---|---|---|
| Example 1 | 40.9 | 0.6 | 18 | 20.0 | 55 | 1.1 | 753 |
| Example 2 | 32.5 | 0.1 | 28 | 48.3 | 85 | 1.7 | 651 |
| Example 3 | 33.5 | 0.3 | 42 | 59.4 | 110 | 1.4 | 680 |
| Example 4 | 38.3 | 0.8 | 20 | 26.0 | 65 | 1.3 | 698 |
| Example 5 | 54.6 | 1.7 | 13 | 14.3 | 45 | 1.1 | 852 |
| Example 6 | 32.9 | 0.0 | 31 | 49.6 | 90 | 1.6 | 663 |
| Example 7 | 22.3 | 2.9 | 47 | 65.8 | 125 | 1.4 | 726 |
| Example 8 | 23.2 | 0.4 | 17 | 32.3 | 140 | 1.9 | 553 |
| Com. Ex. 1 | 26.8 | 0.2 | 22 | 61.6 | 210 | 2.8 | 610 |
| Com. Ex. 2 | 8.9 | 0.0 | 4 | 17.2 | — | 4.3 | 426 |
| Com. Ex. 3 | 15.4 | 24.9 | 11 | 84.7 | 135 | 7.7 | 712 |
| Conv. Ex. 1 | 5.7 | 0.0 | 6 | 32.4 | — | 5.4 | 570 |
| Conv. Ex. 2 | 7.4 | 8.5 | 8 | 52.0 | 550 | 6.5 | 659 |

| No. | Wear Depth (μm) | Surface Roughness Rz (μm) | Area Ratio of Seizure (%) | KIC (kg/mm$^{3/2}$) | Average Thermal Expansion Coefficient ($\times 10^{-6}$/° C.) | Thermal Conductivity (W/m·K) | Modulus of Elasticity (GPa) |
|---|---|---|---|---|---|---|---|
| Example 1 | 1.1 | 3.2 | 45 | 72.8 | 8.6 | 18.5 | 260 |
| Example 2 | 1.8 | 2.8 | 53 | 76.3 | 8.9 | 20.2 | 253 |
| Example 3 | 2.1 | 3.7 | 50 | 76.7 | 9.4 | 21.8 | 281 |
| Example 4 | 1.4 | 3.2 | 47 | 75.4 | 8.8 | 19.6 | 258 |
| Example 5 | 0.8 | 2.8 | 41 | 71.2 | 8.1 | 17.1 | 264 |
| Example 6 | 1.9 | 3.7 | 51 | 76.8 | 9.0 | 20.3 | 255 |
| Example 7 | 2.8 | 4.1 | 53 | 70.9 | 9.8 | 24.4 | 278 |
| Example 8 | 2.5 | 4.4 | 59 | 78.4 | 9.5 | 22.8 | 244 |
| Com. Ex. 1 | 4.2 | 6.3 | 71 | 74.7 | 10.1 | 26.0 | 234 |
| Com. Ex. 2 | 9.3 | 4.2 | 87 | 82.9 | 10.9 | 30.5 | 235 |
| Com. Ex. 3 | 4.1 | 5.8 | 45 | 63.2 | 10.5 | 26.2 | 238 |
| Conv. Ex. 1 | 13.0 | 4.5 | 39 | 72.4 | 12.3 | 28.8 | 205 |
| Conv. Ex. 2 | 5.1 | 4.9 | 63 | 70.6 | 11.9 | 29.9 | 227 |

Note:
[(1)]Average particle distance/average equivalent circle diameter.

Figure 13:
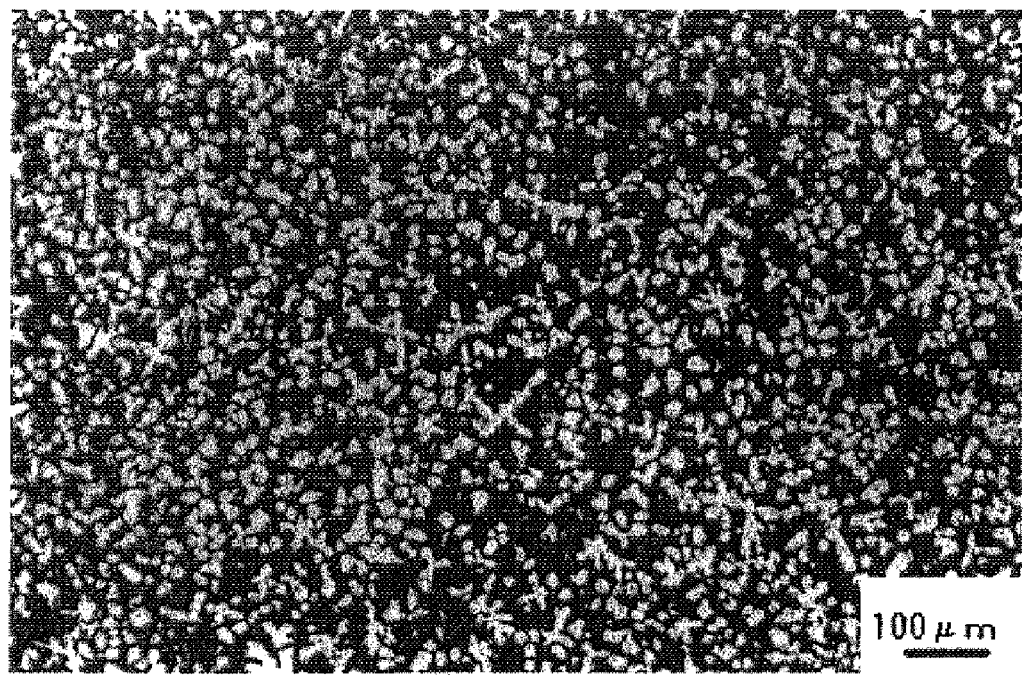
FIG. 13 is an optical photomicrograph showing the metal structure of the test piece of Example 4.
Figure 14:
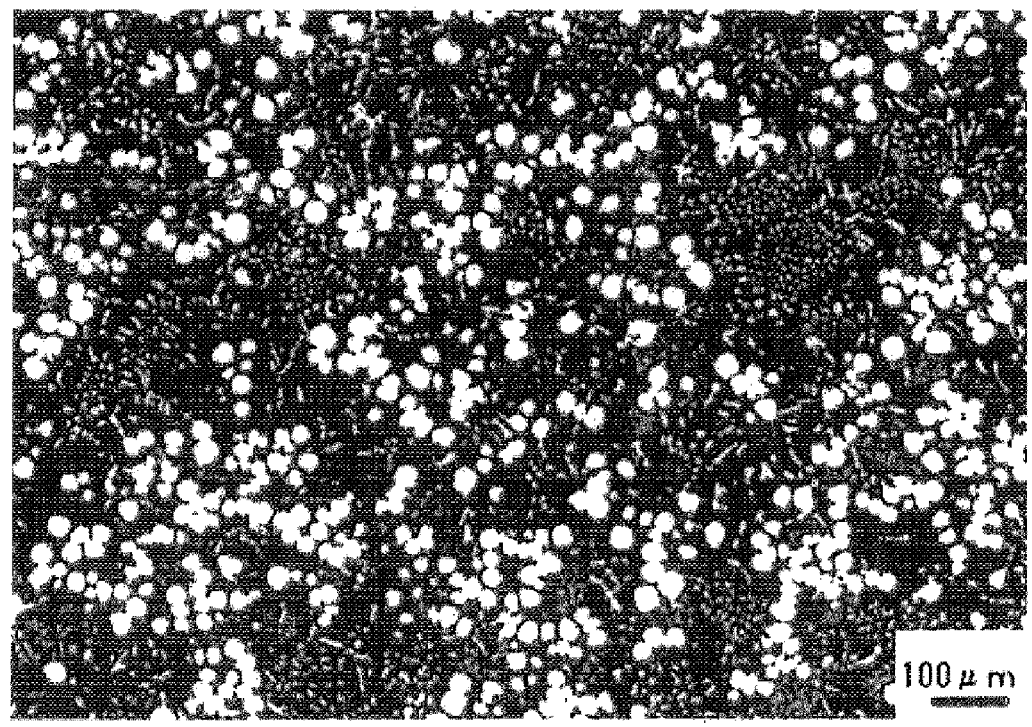
FIG. 14 is an optical photomicrograph showing the metal structure of the test piece of Comparative Example 1.

FIGS. 13 and 14 show the metal structures of the test pieces of Example 4 and Comparative Example 1. White portions represent MC carbide, and black portions represent the matrix. It is clear that MC carbide was distributed at a high concentration in the test piece of Example 4, while MC carbide was partially segregated in the test piece of Comparative Example 1.

Figure 15:
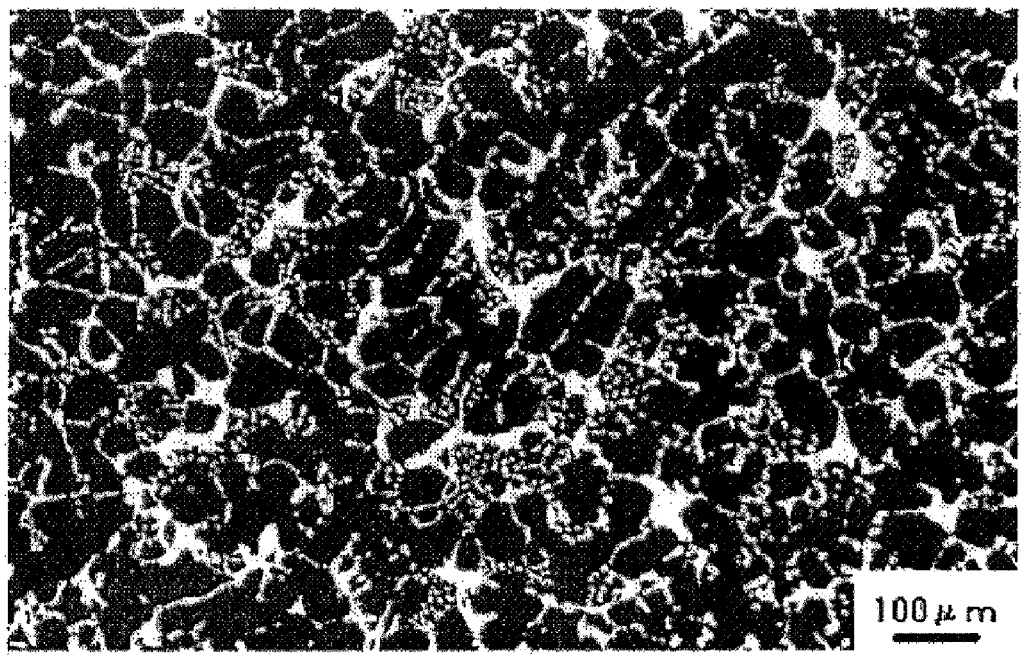
FIG. 15 is an optical photomicrograph showing the metal structure of the test piece of Conventional Example 2.

FIG. 15 shows the metal structure of a high-speed steel roll material used in Conventional Example 2. White fine particles are MC carbide, white network portions are carbides of $M_2C$, $M_6C$ and $M_7C_3$, and a black portion is a matrix. It is clear that in the roll material of Conventional Example 2, MC carbide was distributed with partial segregation, while the carbides of $M_2C$, $M_6C$ and $M_7C_3$ were distributed in a network manner.

Wear depth in Examples 1-8 was substantially half or less as compared with Conventional Example 1, indicating that the former had excellent wear resistance. Examples 1-8 were better Conventional Example 1 in any of surface roughening resistance, seizure resistance and toughness.

Figure 16:
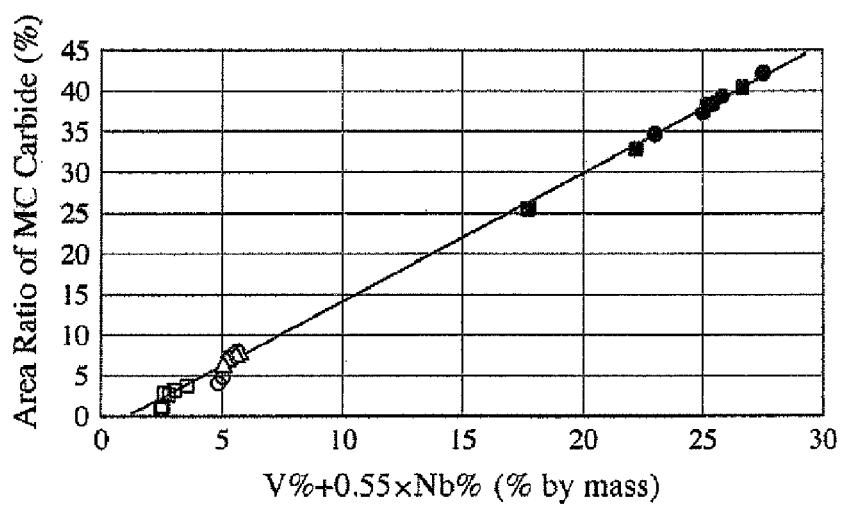
FIG. 16 is a graph showing the relation between the value of (V %+0.55×Nb %) and an area ratio of MC carbide.

FIG. 16 shows the relation between the area ratio of MC carbide and the value of the formula (1): V %+0.55×Nb %. With their substantially straight linear relation, when (V%+ thermal expansion coefficient in a range of 100° C. to 600° C. was $10 \times 10^{-6}$/° C. or less in Example 4, substantially $9 \times 10^{-6}$/° C. to $10.5 \times 10^{-6}$/° C. in Comparative Example 1, and substantially $11 \times 10^{-6}$/° C. to $13 \times 10^{-6}$/° C. in Conventional Example 2. As is clear from Table 3, All of Examples 4-8 exhibited average thermal expansion coefficients of $10 \times 10^{-6}$/° C. or less in a range from room temperature to 300° C., suggesting drastic suppression of thermal crown. This appears to be due to the fact that 20% or more by area of MC carbide was dispersed. Particularly when the area ratio of MC carbide exceeds 30%, the average thermal expansion coefficient becomes $9 \times 10^{-6}$/° C. or less, resulting in large thermal-crown-suppressing effect.

Figure 18:
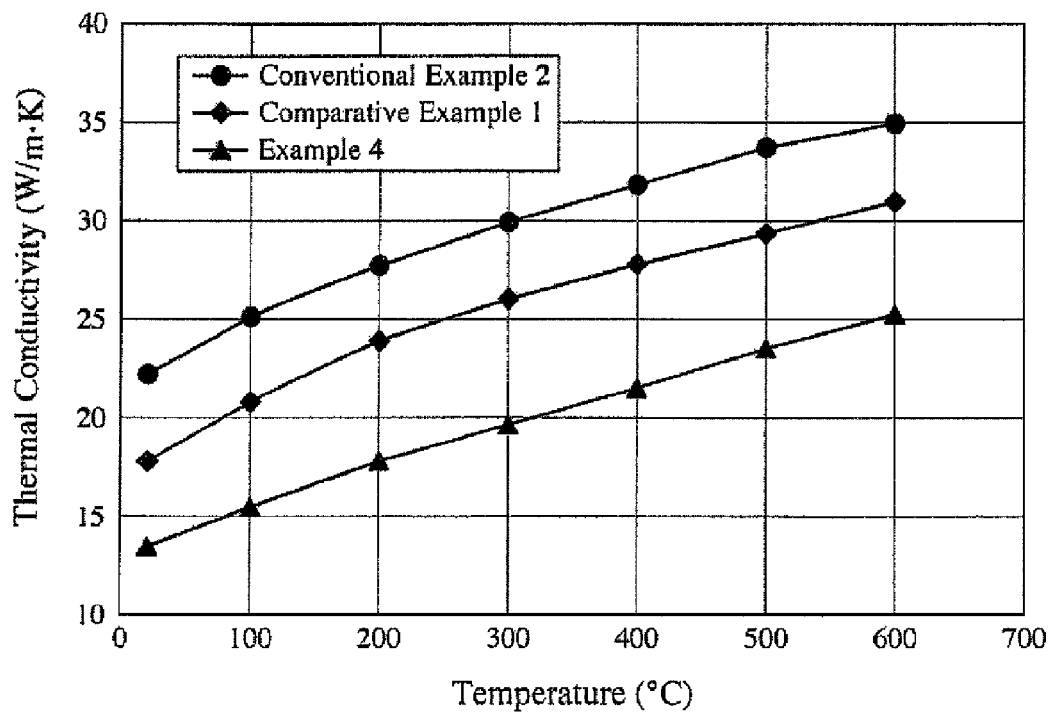
FIG. 18 is a graph showing the relation between a thermal conductivity and a temperature in the test pieces of Example 4, Comparative Example 1 and Conventional Example 2.

FIG. 18 shows the thermal conductivities of Example 4, Comparative Example 1 and Conventional Example 2 from room temperature to 600° C. In the figure, the abscissa axis represents a temperature (° C.), and the ordinate axis represents thermal conductivity (W/m·K). The thermal conductivity at 300° C. was less than 20 W/m·K in Example 4, more than 25 W/m·K in Comparative Example 1, and 30 W/m·K in Conventional Example 2. As is clear from Table 3, all of Examples 4-8 exhibited thermal conductivity of 25 W/m·K or less at 300° C., suggesting drastic suppression of thermal crown. This appears to be due to the fact that 20% or more by area of MC carbide was dispersed. Particularly when the area ratio of MC carbide exceeds 30%, the thermal conductivity becomes 21 W/m·K or less at 300° C., resulting in large thermal-crown-suppressing effect.

All of Examples 4-8 exhibited modulus of elasticity of 240 GPa or more, and particularly those having large area % of MC carbide exhibited much higher modulus of elasticity than that of the conventional material.

In the test piece of Comparative Example 1, the diameter of a circle inscribed in each region containing no MC carbide particles, whose equivalent circle had diameters of 15 μm or more, exceeded 150 μm, and a ratio (B/A) of the average distance B between MC carbide particles, whose equivalent circles had diameters of 15 μm or more to the average diameter A of circles equivalent to the MC carbide particles exceeded 2. Accordingly, the test piece of Comparative Example 1 was poor in surface roughening resistance and seizure resistance.

Comparative Example 2 was outside the range of the present invention in the C content, the formula (2), the area ratio of MC carbide, the matrix hardness, and the average diameter of circles equivalent to the MC carbide particles, and its B/A exceeded 2. Accordingly, it was poor in wear resistance and seizure resistance. It had an average thermal expansion coefficient of more than $10 \times 10^{-6}$/° C. in a range from room temperature to 300° C., and thermal conductivity of more than 25 W/m·K at 300° C., failing to sufficiently suppressing thermal crown growth.

Comparative Example 3 was outside the range of the present invention in the V content, the formulae (1) and (2), the area ratio of MC carbide, and the total area ratio of $M_2C$, $M_6C$ and $M_7C_3$ carbides, and its B/A exceeded 2. Accordingly, it was poor in surface roughening resistance and toughness. It had an average thermal expansion coefficient of more than $10 \times 10^{-6}$/° C. in a range from room temperature to 300° C., and thermal conductivity of more than 25 W/m·K at 300° C., failing to sufficiently suppressing thermal crown growth.

Conventional Example 1 was outside the range of the present invention in the V content, the formula (1), the area ratio of MC carbide, and the average diameter of circles equivalent to the MC carbide particles, and its B/A exceeded 2. Accordingly, it was poor in wear resistance. It had an average thermal expansion coefficient of more than $10 \times 10^{-6}$/° C. in a range from room temperature to 300° C., and thermal conductivity of more than 25 W/m·K at 300° C., failing to sufficiently suppressing thermal crown growth.

Effect of the Invention

The centrifugally cast roll outer layer of the present invention exhibits excellent wear resistance, surface roughening resistance and seizure resistance, when used as a work roll, particularly a work roll at a finishing stage of a hot strip mill, thereby contributing to improvement in productivity and yield consumption in rolling. Because the method of the present invention using a conventional centrifugal casting apparatus can uniformly disperse a large amount of MC carbide without necessity of remarkably elevating a melt temperature to increase a V content in a melt, a centrifugally cast outer layer for a roll having excellent wear resistance, surface roughening resistance and seizure resistance can be produced at a low cost.

What is claimed is:

1. A method for producing an outer layer for a roll having a structure having MC carbide dispersed at an area ratio of 20-60%, comprising the steps of centrifugally casting a melt having a composition comprising, by mass, 2.2-6.0% of C, 0.1-3.5% of Si, 0.1-3.5% of Mn, and 8-22% of V, the balance being Fe and inevitable impurity elements, to produce a cylindrical body comprising an inner layer having concentration MC carbide, an MC-carbide-poor outer layer, and a concentration gradient layer between said inner layer and said outer layer, in which the area ratio of MC carbide changes, and cutting said cylindrical body to a depth at which the area ratio of MC carbide is 20% or more.

2. The method for producing an outer layer for a roll according to claim 1, wherein said outer layer has a composition comprising, by mass, 2.5-9% of C, 0.1-3.5% of Si, 0.1-3.5% of Mn, and 11-40% of V, the balance being Fe and inevitable impurity elements.

3. The method for producing an outer layer for a roll according to claim 1, wherein said outer layer further comprises at least one selected from the group consisting of 1-15% of Cr, 0.5-20% of Mo and 1-40% of W by mass.

4. The method for producing an outer layer for a roll according to claim 1, wherein in said outer layer part of V is substituted by Nb in an amount satisfying the following formula (3):

$$11\% \leq V\% + 0.55 \times Nb\% \leq 40\% \text{ (by mass)} \quad (3).$$

5. The method for producing an outer layer for a roll according claim 1, wherein the composition comprises Nb and said outer layer satisfies the following formula (2):

$$0 \leq C\% - 0.2 \times (V\% + 0.55 \times Nb\%) \leq 2\% \text{(by mass)} \quad (2).$$

6. The method for producing an outer layer for a roll according to claim 1, wherein the matrix of said outer layer has Vickers hardness Hv of 550-900.

7. The method for producing an outer layer for a roll according to clam 1, wherein carbide particles of $M_2C$, $M_6C$ and $M_2C_3$, whose equivalent circles have diameters of 1 μm or more, are dispersed in a total amount of 0-5% by area in the structure of said outer layer.

* * * * *